(12) United States Patent
Moon et al.

(10) Patent No.: US 11,257,221 B2
(45) Date of Patent: Feb. 22, 2022

(54) APPARATUS AND METHOD FOR DETECTING FALLING OBJECT

(71) Applicant: LG ELECTRONICS INC., Seoul (KR)

(72) Inventors: Jun Ho Moon, Seoul (KR); Hyun Kyu Kim, Seoul (KR); Ki Bong Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 379 days.

(21) Appl. No.: 16/569,523

(22) Filed: Sep. 12, 2019

(65) Prior Publication Data
US 2020/0074640 A1 Mar. 5, 2020

(30) Foreign Application Priority Data

Aug. 14, 2019 (KR) .................. 10-2019-0099772

(51) Int. Cl.
*G06T 7/20* (2017.01)
*G06K 9/00* (2006.01)
(Continued)

(52) U.S. Cl.
CPC ............ *G06T 7/20* (2013.01); *G06K 9/00832* (2013.01); *G06T 7/70* (2017.01); *B60Q 3/76* (2017.02);
(Continued)

(58) Field of Classification Search
CPC ... G06T 7/20; G06T 7/70; G06T 2207/30268; G06K 9/00832; B60Q 3/76; B60Q 3/80;
(Continued)

(56) References Cited

U.S. PATENT DOCUMENTS

2006/0251293 A1* 11/2006 Piirainen ........... B60R 21/01516
382/104
2010/0130160 A1* 5/2010 Fayyad ................. G08B 25/08
455/404.1
(Continued)

FOREIGN PATENT DOCUMENTS

JP            08238976         9/1996
JP           2006279837        10/2006
(Continued)

OTHER PUBLICATIONS

Korean Intellectual Property Office Application No. 10-2019-0099772, Notice of Allowance dated Mar. 22, 2021, 2 pages.

*Primary Examiner* — Nizar N Sivji
(74) *Attorney, Agent, or Firm* — Lee Hong Degerman Kang & Waimey

(57) ABSTRACT

Disclosed is a fallen object detection apparatus and method for controlling a component to continuously provide a service, provided by a communication device, when the communication device has fallen inside a vehicle. A fallen object detection apparatus inside a vehicle includes: a monitor configured to monitor an inside of the vehicle in which a passenger and an object are present: an identifier configured to identify that the object is a communication device capable of being connected to the component inside the vehicle in response to determination that the object is determined to have fallen on the basis of a monitoring result; and a processor configured to connect the object with the component and control the component to continuously provide a service, provided by the object, when the object is identified to be the communication device.

20 Claims, 9 Drawing Sheets

(51) Int. Cl.
*G06T 7/70* (2017.01)
*B60R 11/00* (2006.01)
*B60R 11/04* (2006.01)
*B60Q 3/76* (2017.01)
*B60Q 3/80* (2017.01)

(52) U.S. Cl.
CPC ............... *B60Q 3/80* (2017.02); *B60R 11/04* (2013.01); *B60R 2011/0003* (2013.01); *G06T 2207/30268* (2013.01)

(58) Field of Classification Search
CPC ............ B60R 11/04; B60R 2011/0003; B60R 2011/0028; B60R 16/0232; B60R 11/0241; B60R 21/01512; B60W 40/08; H04N 5/225; H04W 4/80
See application file for complete search history.

(56) References Cited

U.S. PATENT DOCUMENTS

| | | | | |
|---|---|---|---|---|
| 2014/0097957 | A1* | 4/2014 | Breed | G08B 21/0407 340/576 |
| 2014/0277935 | A1* | 9/2014 | Daman | B60N 2/28 701/36 |
| 2016/0332535 | A1* | 11/2016 | Bradley | G08B 21/24 |
| 2017/0263123 | A1* | 9/2017 | Sachdev | G08B 19/00 |
| 2017/0297587 | A1* | 10/2017 | Mimura | B60W 50/0097 |
| 2018/0204335 | A1* | 7/2018 | Agata | G08B 29/188 |

FOREIGN PATENT DOCUMENTS

| | | | |
|---|---|---|---|
| JP | 2010108371 | | 5/2010 |
| KR | 1020120070420 | | 6/2012 |
| KR | 2020120005732 | | 8/2012 |
| KR | 1020170018033 | * | 2/2017 |

* cited by examiner

<VIDEO PLAYBACK>

APPARATUS AND METHOD FOR DETECTING FALLING OBJECT

CROSS-REFERENCE TO RELATED APPLICATION

Pursuant to 35 U.S.C. § 119, this application claims the benefit of earlier filing date and right of priority to Korean Patent Application No. 10-2019-0099772, filed on Aug. 14, 2019, the contents of which are all hereby incorporated by reference herein in its entirety.

BACKGROUND

1. Technical Field

The present disclosure relates to an apparatus and a method for detecting a fallen object, wherein when a communication device capable of performing short-range wireless communication falls inside a vehicle, the apparatus connects the communication device with a component within the vehicle on the basis of the short-range wireless communication and controls the component to continuously provide a service that has been provided by the communication device.

2. Description of Related Art

Due to the development of communication, mobile phones are capable of providing various services, for example, voice calls and video calls, anytime and anywhere without any limitations on time and place.

For example, a driver can use a mobile phone in a vehicle that is moving. However, when a driver drops a mobile phone while a vehicle is in motion, the driver cannot use services provided by the mobile phone. Accordingly, the driver may become disconcerted and lose focus on driving, which may result in a dangerous situation.

Therefore, various cradles for fixing a mobile phone inside a vehicle to prevent the mobile phone from falling have been released for driving convenience and safety.

Korea Patent Application Publication No. 20-2012-0005732, entitled "Cellular phone supporter for vehicle," discloses a mobile phone cradle for a vehicle, the cradle, capable of holding a mobile phone regardless size, having an upward and downward movable support installed to support the upper portion of the mobile phone, and a pedestal capable of being repositioned to the left and right installed on both sides of the lower portion of the cradle.

However, when a vehicle is driven at a high speed or driven on an unpaved road, a mobile phone may easily separate from a cradle and may fall due to an increase in the movement of the vehicle.

Accordingly, a technology for continuously providing mobile phone services so as to allow a driver to focus on driving without becoming disconcerted due to the mobile phone falling inside the vehicle.

RELATED ART DOCUMENT

Patent Document

Related Art: Korean Patent Application Publication No. 20-2012-0005732

SUMMARY OF THE INVENTION

An aspect of an embodiment of the present disclosure is to provide an apparatus and a method for detecting a fallen object, the apparatus and the method connecting a communication device with a component inside a vehicle, for example, a speaker, a microphone, and an audio video navigation (AVN) screen, and controlling the component to continuously provide a service, which is provided by the communication device, when the communication device capable of performing short-range wireless communication falls inside a vehicle. This allows a driver to focus on driving without being disconcerted even though the driver drops the communication device by being provided continuous service from the communication device via the component inside the vehicle.

Another aspect of an embodiment of the present disclosure is to turn on a lamp inside the vehicle to illuminate a location to which the object has fallen while a passenger searches for the object when the inside of the vehicle is dark so as to quickly identify the location of the fallen object and assist the passenger in finding the object easily.

Yet another aspect of an embodiment of the present disclosure is to provide notification information of the fallen object via the component or the lamp inside the vehicle when the passenger is not searching for the object even though the vehicle stops, thereby preventing the fallen object from being left in the vehicle.

In accordance with an aspect of the present disclosure, an apparatus for detecting a fallen object inside a vehicle is provided. The apparatus includes: a monitor configured to monitor an inside of the vehicle in which a passenger and an object are present; an identifier configured to, in response to determination that the object has fallen inside the vehicle on the basis of a monitoring result, identify that the object is a communication device capable of being connected to a component inside the vehicle; and a processor configured to, based on identification that the object is the communication device, connect the object with the component and control the component to continuously provide a service which is provided by the object.

The monitor may include: a capturer configured to generate an image by capturing the inside of the vehicle according to a preset period; and a tracker configured to track movement of the passenger and movement of the object based on that the passenger and the object are extracted from the image. The identifier may be configured to determine, on the basis of a tracking result, that the object has fallen in response that a distance between a hand of the passenger and the object is a preset distance or longer, and the object falls downward by a preset distance or longer.

The monitor may be configured to generate an image by capturing the inside of the vehicle according to a preset period. The processor may be configured to store the image in a database from a time point at which the object falls, and in response that the object moves to a blind spot beyond a capturing range such that a location to which the object has fallen cannot be identified in the image, provide the stored image via the component to allow the passenger to see the object fall and move to the blind spot.

In response that the object provides at least one service from among a voice call, a video call, or video playback, the processor may be configured to select a component required to provide the service from among components including at least one of a speaker, a microphone, or an audio video navigation (AVN) screen inside the vehicle and connect the selected component with the object.

The identifier may be configured to identify that the object is the communication device in response that the object is a device corresponding to one of a smartphone, wireless earphones, a tablet personal computer (PC), or a notebook capable of performing short-range wireless communication.

The apparatus may further include a communicator configured to communicate with the object and receive identification information of the object, wherein the processor is configured to receive the identification information from the object via the communicator, and in response that the received identification information is found in a pre-stored connected device list, connect the object with the component.

The identifier may be configured to further identify that the passenger searches for the object, and the processor may be configured to turn on a first lamp inside the vehicle to illuminate a location to which the object has fallen in response that the passenger searches for the object and a result value of an illumination sensor inside the vehicle is smaller than a preset value.

In case that the first lamp cannot illuminate the object due to movement of the passenger, the processor may be configured to turn off the first lamp and turn on a second lamp capable of illuminating the object while avoiding a path obscured by the passenger.

The monitor may include: the capturer configured to generate the image by capturing the inside of the vehicle according to the preset period; and the tracker configured to track the movement of the passenger in response that the passenger is extracted from the image. The identifier may be configured to determine that the passenger lowers his/her head on the basis of the tracking result, and based on determination that the passenger lowers his/her head, identify that the passenger is searching for the object.

Based on identification that the passenger is not searching for the object, the processor may be configured to provide notification information of the object via the component or the lamp inside the vehicle in response that driving of the vehicle is terminated.

Based on identification that a plurality of objects which have fallen at an interval shorter than a preset time difference are communication devices capable of being connected to the component inside the vehicle, the processor may be configured to select an object having a high priority from among the plurality of objects on the basis of a preset criterion and connect the selected object with the component.

In accordance with another aspect of the present disclosure, a method for detecting a fallen object inside a vehicle is provided. The method includes: monitoring an inside of the vehicle in which a passenger and an object are present; in response to determination that the object has fallen inside the vehicle on the basis of a monitoring result, identifying that the object is a communication device capable of making a short-range wireless communication connection with a component inside the vehicle; and based on identification that the object is the communication device, connecting the object with the component and controlling the component to continuously provide a service which is provided by the object.

The monitoring of the inside of the vehicle may include: generating an image by capturing the inside of the vehicle according to a preset period; and tracking movement of the passenger and movement of the object based on that the passenger and the object are extracted from the image. The identifying of that the object is the communication device capable of being connected to the component inside the vehicle may include determining, on the basis of a tracking result, that the object has fallen in response that a distance between a hand of the passenger and the object is a preset distance or longer, and the object falls downward by a preset distance or longer.

The monitoring of the inside of the vehicle may include generating an image by capturing the inside of the vehicle according to a preset period, and the method for detecting the fallen object may include: storing the image in a database from a time point at which the object falls; and in response that the object moves to a blind spot beyond a capturing range such that a location to which the object has fallen cannot be identified in the image, providing the stored image via the component to allow the passenger to see the object fall and move to the blind spot.

The controlling of the component may include, in response that the object provides at least one service from among a voice call, a video call, or video playback, selecting a component required to provide the service from among components including at least one of a speaker, a microphone, or an audio video navigation (AVN) screen inside the vehicle and connecting the selected component with the object.

The controlling of the component may include receiving the identification information from the object via the communicator, and in response that the received identification information is found in a pre-stored connected device list, connecting the object with the component.

The method may further include identifying that the passenger searches for the object and turning on a first lamp inside the vehicle and to illuminate a location to which the object has fallen in response that the passenger searches for the object and a result value of an illumination sensor inside the vehicle is smaller than a preset value.

In case that the first lamp cannot illuminate the object due to movement of the passenger, the method may further include turning off the first lamp and turning on a second lamp capable of illuminating the object while avoiding a path obscured by the passenger.

Based on identification that the passenger is not searching for the object, the method may further include turning off the first lamp and turning on a second lamp capable of illuminating the object while avoiding a path obscured by the passenger.

The controlling of the component may include, based on identification that a plurality of objects which have fallen at an interval shorter than a preset time difference are communication devices capable of making the short-range wireless communication connection with the component inside the vehicle, selecting an object having a high priority from among the plurality of objects, on the basis of a preset criterion, and connecting the selected object with the component.

In addition, another method and another system for implementing the present disclosure and a computer-readable recording medium having a computer program stored therein to perform the method may be further provided.

Other aspects and features as well as those described above will become clear from the accompanying drawings, the claims, and the detailed description of the present disclosure.

According to the present disclosure, when a communication device capable of performing short-range wireless communication falls inside a vehicle, the communication device is connected to a component inside the vehicle, for example, a speaker, a microphone, or an AVN screen, and the component is controlled to continuously provide a service, which is provided by the communication device, so that even though the communication device falls while a driver is driving, the service can be continuously provided from the communication device via the component inside the vehicle. Thus the driver can focus on driving without being disconcerted.

According to the present disclosure, when the inside of the vehicle is dark while the passenger is searching for the fallen object, it is possible to turn on a lamp inside the vehicle to illuminate a location to which the object has fallen so as to quickly identify the location of the fallen object and assist the passenger in finding the object easily.

According to the present disclosure, when the passenger is not searching for the fallen object even though the vehicle stops, it is possible to prevent the fallen object from being left in the vehicle by providing notification information of the fallen object via the component or the lamp inside the vehicle.

Effects of the present disclosure are not limited to the above description, and other effects, which have not been mentioned, can be clearly understood by those skilled in the art from the following description.

DETAILED DESCRIPTION

Figure 1:
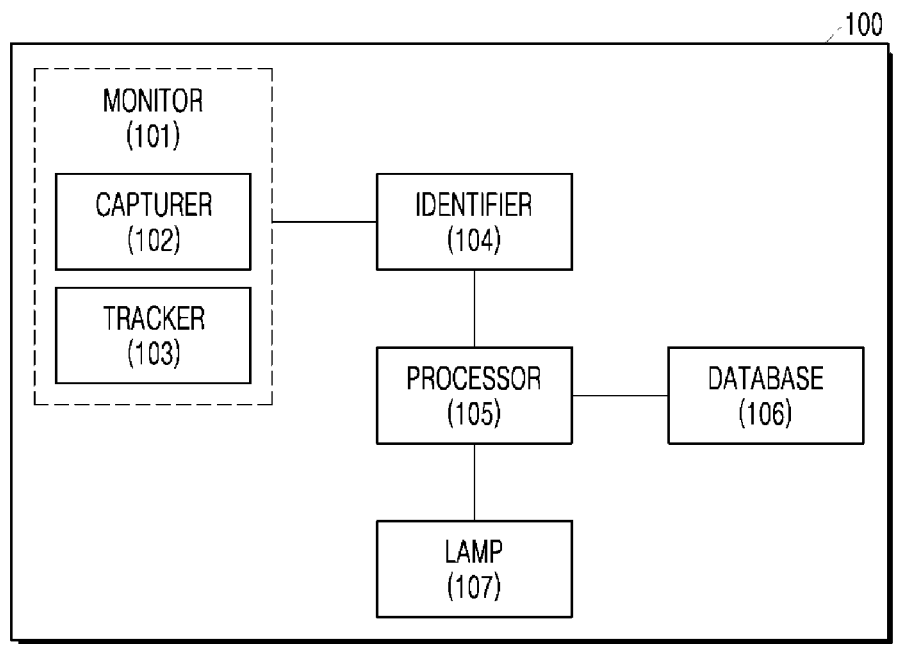
FIG. 1 is a block diagram illustrating a fallen object detection device according to an embodiment of the present disclosure.

The advantages and features of the present disclosure and ways to achieve them will be apparent by making reference to embodiments as described below in detail in conjunction with the accompanying drawings. However, it should be construed that the present disclosure is not limited to the embodiments disclosed below but may be implemented in various different forms, and covers all the modifications, equivalents, and substitutions belonging to the spirit and technical scope of the present disclosure. The embodiments disclosed below are provided so that this disclosure will be thorough and complete and will fully convey the scope of the present disclosure to those skilled in the art. Further, in the following description of the present disclosure, a detailed description of known technologies incorporated herein will be omitted when it may make the subject matter of the present disclosure rather unclear.

The terms used in this application is for the purpose of describing particular embodiments only and is not intended to limit the disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof. Although the terms "ordinal numbers" such as first, second and the like are used to describe various structural elements, the structural elements should not be defined by the terms. The terms are used merely for the purpose to distinguish an element from the other elements.

Hereinafter, embodiments of the present disclosure will be described in detail with reference to the accompanying drawings, and in the description with reference to the accompanying drawings, the same or corresponding components have the same reference numeral, and a duplicate description therefor will be omitted.

Vehicles described in this specification may include all vehicles such as a motor vehicle having an engine as a power source, a hybrid vehicle having an engine and an electric motor as power sources, and an electric vehicle having an electric motor as a power source.

Further, vehicles described in this specification may be autonomous vehicles.

Autonomous driving is a self-driving technology, and an autonomous vehicle is a vehicle that moves without any manipulation by a user or with minimum manipulation by a user. For example, autonomous driving may include all of a technology for keeping a driving lane, a technology for automatically controlling a speed such the an adaptive cruise control, a technology for automatically driving a vehicle along a determined path, and a technology for, if a destination is set, automatically setting a path and driving a vehicle along the path.

Specifically, an autonomous vehicle may include an autonomous driving control module configured to control an autonomous driving function, and the autonomous driving control module may be a software module or a chip obtained by implementing the software module in hardware. The autonomous driving control module may be included in the autonomous vehicle as an element thereof or may be configured as separate hardware outside the autonomous vehicle and connected thereto.

The autonomous vehicle may acquire state information of the autonomous vehicle on the basis of sensor information acquired from various types of sensors, detect (recognize) a surrounding environment and object, produce map data, determine a movement path and a driving plan, or determine an operation.

The autonomous vehicle may use sensor information acquired by, for example, at least one sensor from among a lidar, a radar, or a camera in order to determine the movement path and the driving plan.

Particularly, the autonomous vehicle may recognize an environment or an object in an area obscured from sight or an area away by a predetermined distance or longer by receiving sensor information from external devices or may receive directly recognized information from external devices.

The autonomous vehicle may perform the operations using a learning model formed with one or more artificial neural networks. For example, the autonomous vehicle may recognize the surrounding environment and object through the learning model and determine a traffic line of driving on the basis of the recognized surrounding environment information or object information. The learning model may be directly learned by the autonomous vehicle or learned by an external device such as an AI server.

The autonomous vehicle may generate a result directly using the learning model and perform an operation, but may transmit sensor information ton an external device such as an AI server, receive a result generated according thereto, and perform an operation.

The autonomous vehicle may determine a movement path and a driving plan on the basis of at least one piece of map data, object information detected from sensor information, or object information acquired from an external device and move according to the determined movement path and driving plan by controlling a driving unit.

The map data may include object identification information of various objects in a space (for example, on a road) in which the autonomous vehicle moves. For example, the map data may include object identification information of stationary objects such as a streetlamp, a rock, and a building and moveable objects such as a vehicle and a pedestrian. The object identification information may include a name, a type, a street, and a location.

The autonomous vehicle may perform an operation or move by controlling a driving unit on the basis of the control/interaction of the user. The autonomous vehicle may acquire information on the intention of the interaction according to a user's speech, determine a response on the basis of the acquired intention information, and perform an operation.

FIG. 1 is a block diagram illustrating a fallen object detection device according to an embodiment of the present disclosure.

Referring to FIG. 1, a fallen object detection device 100 according to an embodiment of the present disclosure is a device configured to detect a fallen object inside a vehicle and may be installed inside the vehicle. The fallen object detection device 100 may include a monitor 101, an identifier 104, a processor 105, a database 106, and a lamp 107. The fallen object detection device 100 may further include a communicator (not shown).

The monitor 101 may monitor the inside of the vehicle in which passengers (for example, a driver and a fellow passenger) and objects are present. The monitor 101 configured to monitor the inside of the vehicle may include a capturer 102 and a tracker 103.

The capturer 102 may be, for example, a camera, and may capture the inside of the vehicle according to a preset period (for example, 1 second) to generate an image (for example, a 2D or 3D image).

When a passenger and an object are extracted from the image generated by the capturer 102, the tracker 103 may track movement of the passenger (for example, upper body, a direction of the face, or a change in coordinates of arms) and movement of the object. The tracker 103 may extract the passenger and the object from the image through a learning model (for example, an in-depth neural network) trained to recognize a person and an object.

Thereafter, in response that the passenger is extracted, the tracker 103 may track movement of the passenger by detecting a distance and a direction of movement of arms, legs, head, and face of the passenger from the image through a skeletonization algorithm. When the object is extracted, the tracker 103 may track movement of the object by detecting a movement distance and a direction of the object from the image through an object detection algorithm.

When the object falls by a preset distance or longer on the basis of the tracking result, the identifier 104 may determine that the object has fallen and identify a location to which the object has fallen. That is, when the object is removed or moves from, for example, a cradle, a seat, or a passenger's hand, and falls by a preset distance or longer, the identifier 104 may determine that the object has fallen.

In the case in which the passenger holds the objects, when the distance between the passenger's hand and the object is a preset distance or longer, and the object falls by a preset distance or longer on the basis of the tracking result, the identifier 104 may determine that the object has fallen. That is, the identifier 104 may determine that the object has fallen by further identifying that the object is removed from the passenger's hand as well as the distance to the fallen object. Accordingly, if the distance between the passenger's hand and the object is shorter than a preset distance, the identifier 104 may determine that the object has not fallen even though the object has fallen by the preset distance or longer inside the vehicle. That is, the identifier 104 may recognize that the passenger moves his/her hand down while holding the object and thus determine that the object has not fallen.

In response to determination that the object has fallen inside the vehicle on the basis of the monitoring result, the identifier 104 may identify that the object is a communication device capable of being connected to a component inside the vehicle. In response that the object is a device corresponding to one of a smartphone, wireless earphones, a tablet personal computer (PC), or a notebook capable of performing short-range communication (for example, Bluetooth or Wi-Fi), the identifier 104 may identify that the object is the communication device.

The identifier 104 may further identify that the passenger searches for the object. The identifier 104 may determine that the passenger lowers his/her head on the basis of the tracking result of the movement of the passenger by the tracker 103 of the monitor 101, and based on determination that the passenger lowers his/her head, may identify that the passenger is searching for the object. The identifier 104 may determine that the passenger lowers his/her head on the basis of, for example, a degree of movement of the face (or head) of the passenger or a movement direction.

Meanwhile, when the distance between the passenger's hand and the fallen object is shorter than a preset distance, and the fallen object rises by a preset distance or higher on the basis of the tracking result of the tracker 103 within the monitor 101, the identifier 104 may determine that the passenger has recovered the fallen object.

When the object is identified as the communicator, the processor 105 may connect the object with the component. The processor 105 may first identify the service provided by the object, select a component required to provide the service from among the component inside the vehicle, and connect the selected component with the object. The components inside the vehicle may include at least one of a speaker, a microphone, or an audio video navigation (AVN) screen.

When the object is connected to the component, the processor 105 may first make a request for activation of short-range wireless communication and identification information of the object to the object via the communicator. The object receiving the request may activate short-range wireless communication in response to the request and transmit identification information of the object to the fallen object detection device 100.

When the processor communicates with the object via the communicator and receives identification information of the object from the object, the processor 105 may make a request for the short-range wireless communication connection with the object to the component inside the vehicle via the communicator. When making a request for the short-range wireless communication connection with the object, the processor 105 may transmit identification information of the object to the component and allow the component to have the short-range wireless communication connection with the object.

As a result, when the communication device capable of being connected with the component inside the vehicle falls, the processor 105 may connect the communication device with the component inside the vehicle regardless of that a connected device list has been registered.

In another example of the connection between the object and the component, when identification information received from the object is found in the connected device list pre-stored in the database 106, the processor 105 may connect the object with the component through short-range wireless communication and thus connect only the communication device re-registered in the connected device list with the component inside the vehicle.

Thereafter, when the object is connected to the component, the processor 105 may control the component to continuously provide the service which is provided by the object. The service provided by the object may be any service supported by the communication device and may include, for example, at least one of a voice call, a video call, video playback, a game, or chatting.

For example, when the fallen object inside the vehicle is a smartphone capable of being connected with the component inside the vehicle and a service provided by the smartphone is a "voice call," the processor 105 may connect the smartphone with a speaker and a microphone inside the vehicle and continuously provide the "voice call" through the speaker and the microphone inside the vehicle, thereby maintaining the voice call without disconnection even though the smartphone has fallen. When the service provided by the smartphone is a "video call," the processor 105 may connect the smartphone with all of a speaker, a microphone, and an AVN screen inside the vehicle and continuously provide the "video call" through the speaker, the microphone, and the AVN screen inside the vehicle.

When the service provided by the smartphone is "video playback," the processor 105 may connect the smartphone with a microphone and an AVN screen inside the vehicle and continuously provide the "video playback" through the microphone and the AVN screen inside the vehicle.

Based on identification that a plurality of objects which have fallen within a preset time (for example, 3 seconds) are communication devices capable of being connected to the component inside the vehicle, the processor 105 may select an object having a high priority on the basis of a preset criterion (for example, a predetermined order according to the type of a communication device or an order in the connected device list) from among the plurality of objects and connect the selected object with the component inside the vehicle.

When a plurality of objects, for example, a smartphone and a tablet PC, which are capable of being connected to the component inside the vehicle, fall at an interval of 2 seconds, the processor 105 may select the smartphone having a higher priority from among the plurality of objects and connect the selected smartphone with the component inside the vehicle. When a plurality of objects, for example, a first smartphone (a driver's phone) and a second smartphone (a fellow passenger's phone), which are capable of being connected to the component inside the vehicle, fall at an interval of 2 seconds, the processor 105 may select the first smartphone located at a relatively higher position in the connected device list from among the plurality of objects and connect the selected smartphone with the component inside the vehicle.

When the plurality of objects are connected to each other through short-range wireless communication, the processor 105 may connect all of the plurality of objects with the component inside the vehicle. The plurality of objects may be a main object (for example, a smartphone), which accesses, for example, a mobile communication network or an Internet communication network and provides a service, and an auxiliary object (for example, wireless earphones) connected to the main object.

Meanwhile, when the passenger attempts to pick up the fallen object while the object is not shown, the processor 105 may illuminate the object with the lamp 107.

Specifically, based on identification that the passenger is searching for the object and based on determination that the inside of the vehicle is dark by an illumination sensor (not shown) inside the vehicle (for example, when a result value of the illumination sensor is smaller than a preset value), the processor 105 may turn on a first lamp inside the vehicle to illuminate the location to which the object has fallen. In case that the first lamp cannot illuminate the object due to movement of the passenger, the processor 105 may turn off the first lamp and turn on a second lamp capable of illuminating the object while avoiding a path obscured by the passenger.

Based on identification that the passenger has recovered the fallen object by the identifier 104, the processor 105 may turn off the turned-on lamp. When the recovered object is a communication device connected to the component inside the vehicle, the processor 105 may control the object to continuously provide the service, which is provided by the component, and disconnect the object and the component. That is, the processor 105 may return to the state in which the passenger had been receiving the service through the object before the object fell.

Based on identification that the passenger is not searching for the object, the processor 105 may provide notification information of the object via the component inside the vehicle or the lamp inside the vehicle at the moment the vehicle stops to inform the passenger of the presence of the fallen object, thereby reminding the passenger about the object and assisting the passenger in finding the object even though the passenger does not immediately recover the object.

Meanwhile, based on determination that the object has fallen, the processor 105 may store, in the database 106, an image captured by the monitor 101 from a time point at which the object falls. When the passenger searches for the fallen object or when notification information of the object is provided according to termination of driving of the vehicle, the processor 105 may provide the image.

That is, in response that the object moves to a blind spot beyond a capturing range and cannot be tracked such that the identifier 104 cannot identify the location to which the object has fallen in the image, the processor 105 may provide the stored image via the component inside the vehicle and allow the passenger to see the object fall and move to the blind spot.

The database 106 may store the connected device list in which communication devices are pre-registered in order to allow the connection with the component inside the vehicle. Further, the database 106 may store an image obtained by capturing the inside of the vehicle from a time point at which the object falls.

The lamp 107 may include a plurality of lamps. The plurality of lamps may be installed inside the vehicle to provide illumination in different directions while being spaced apart from each other, and power of the plurality of lamps may be controlled by the processor 105.

Figure 2:
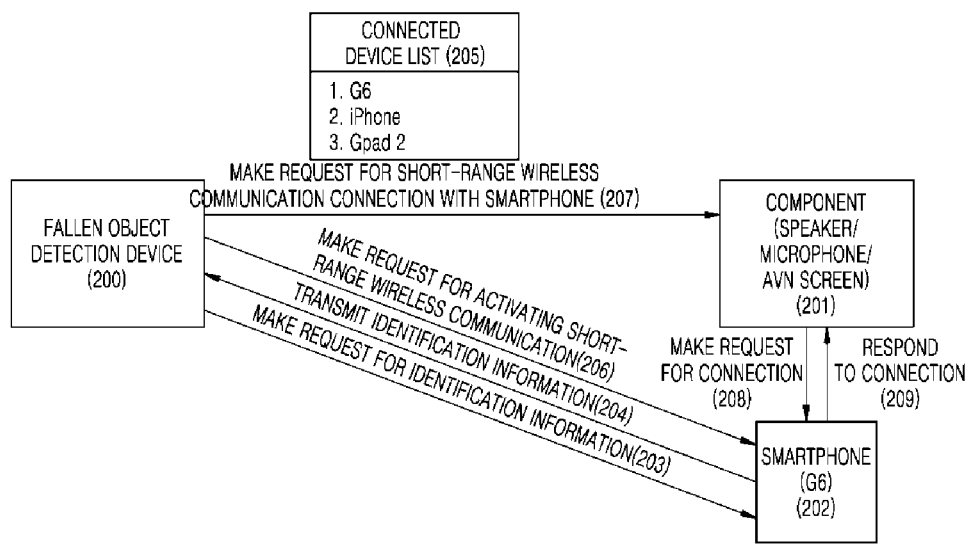
FIG. 2 illustrates a method by which a fallen object detection device connects a fallen object with a component inside a vehicle according to an embodiment of the present disclosure.

FIG. 2 illustrates a method by which the fallen object detection device connects a fallen object with a component inside the vehicle according to an embodiment of the present disclosure.

Referring to FIG. 2, based on identification that the fallen object inside the vehicle is a communicator capable of making the short-range wireless communication connection with a component inside the vehicle (for example, a speaker, a microphone, and an AVN screen), the fallen object detection device may connect the object with the component inside the vehicle.

For example, based on identification that the fallen object inside the vehicle is a smartphone 202 capable of making the short-range communication (for example, Bluetooth) connection with a component 201 inside the vehicle, a fallen object detection device 200 may make a request for identification information to the smartphone 202 (203). The fallen object detection device 200 may receive identification information (for example, G6) of the smartphone 202 from the smartphone 202 in response to the request (204), and when the identification information of the smartphone 202 is found in a pre-stored connected device list 205, may make a request for activating short-range wireless communication to the smartphone 202 (206). The smartphone 202 receiving the request may activate short-range wireless communication.

Thereafter, the fallen object detection device 200 may transmit the identification information of the smartphone 202 to the component 201 while making a request for the short-range wireless communication connection with the smartphone 202 to the component 201 inside the vehicle (207). The component 201 receiving the request may make a request for the short-range wireless communication connection to the smartphone 202 on the basis of the identification information of the smartphone 202 received from the fallen object detection device 200 (208) and receive a connection response from the object (209) so as to complete the short-range wireless communication connection.

Thereafter, the fallen object detection device 200 may control the smartphone 202 to continuously provide the service, via the component 201.

Figure 3:
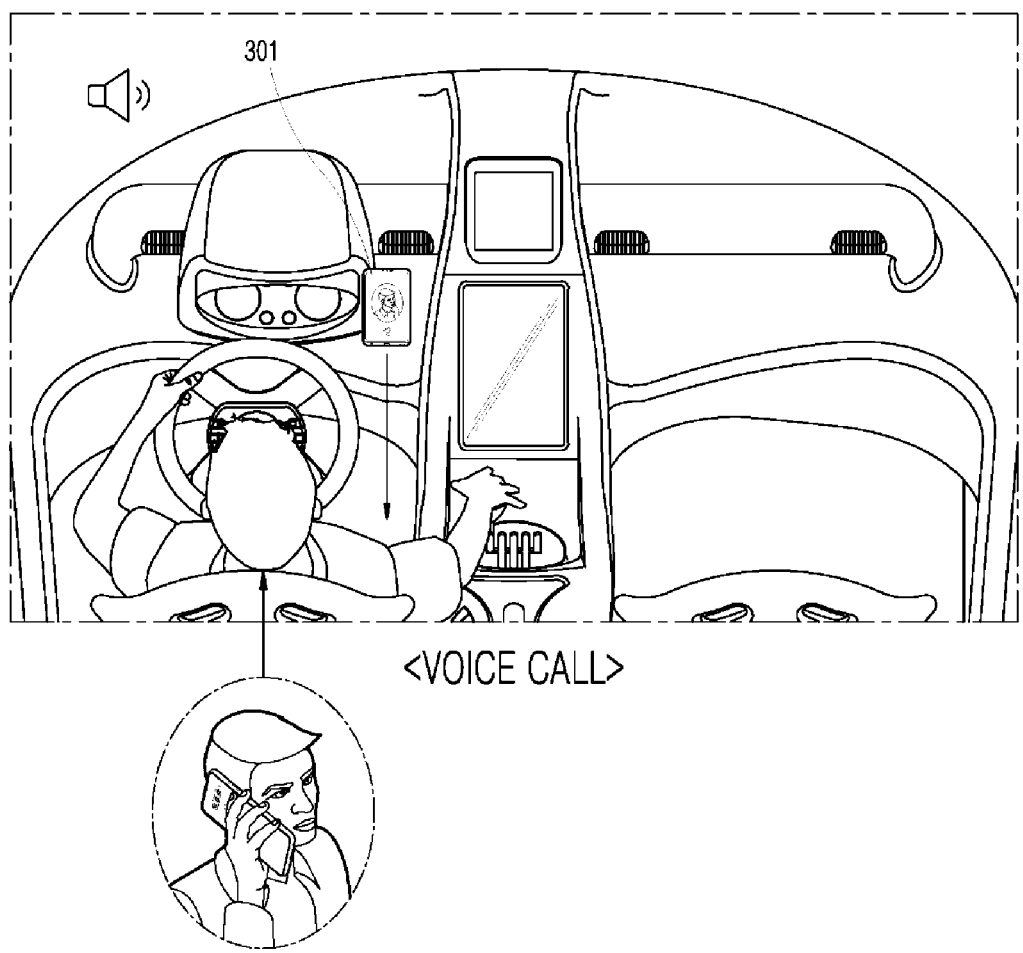
FIGS. 3 to 5 illustrate examples in which a fallen object detection device provides services via components inside a vehicle according to an embodiment of the present disclosure.
Figure 4:
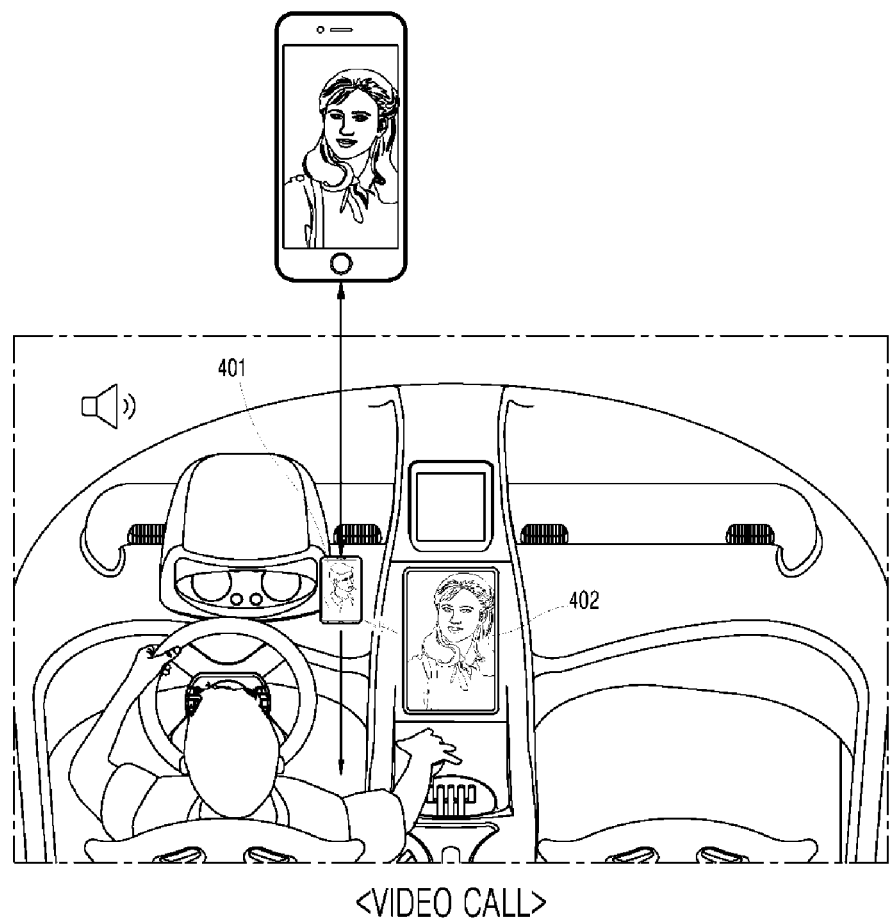
Figure 5:
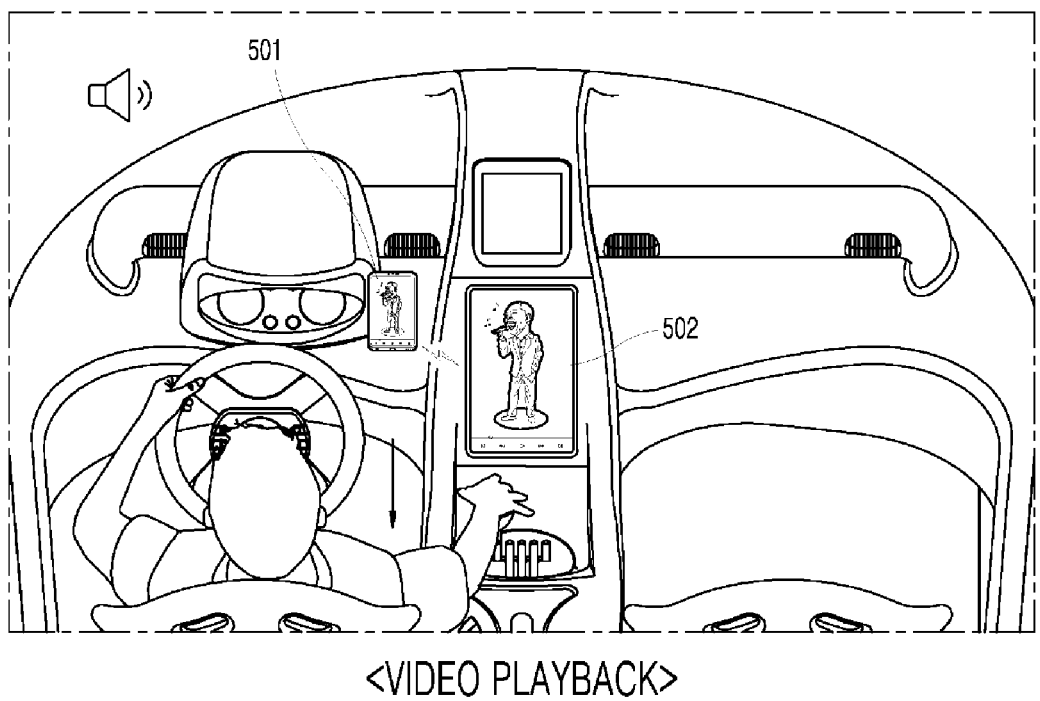

Hereinafter, an example in which the fallen object detection device provides the service via the component inside the vehicle according to an embodiment of the present disclosure will be described with reference to FIGS. 3 to 5. FIGS. 3 to 5 illustrate examples in which the fallen object detection device provides a voice call service, a video call service, and a video playback service through components inside the vehicle according to an embodiment of the present disclosure.

When the fallen object inside the vehicle is a communication device capable of making the short-range wireless communication connection with the component inside the vehicle, the fallen object detection device according to an embodiment of the present disclosure may connect the object with the component and control the component to continuously provide the service provided by the object.

When a smartphone 301 capable of performing a Bluetooth connection with the component inside the vehicle falls as illustrated in FIG. 3, the fallen object detection device may identify that there is a service provided by the smartphone 301. When the service provided by the smartphone 301 is a "voice call," the fallen object detection device may connect the smartphone 301 with a speaker and a microphone inside the vehicle. The fallen object detection device may connect the smartphone 301 with the speaker inside the vehicle via Bluetooth and connect the smartphone with the microphone inside the vehicle so as to replace the a speaker of the smartphone 301 with the speaker inside the vehicle and replace a microphone of the smartphone 301 with the microphone inside the vehicle.

Accordingly, the fallen object detection device may continuously provide the "voice call" through the speaker and the microphone inside the vehicle, so that the voice call may still be connected without disconnection even though the smartphone 301 has fallen.

When a smartphone 401 capable of making a Wi-Fi connection with the component inside the vehicle falls as illustrated in FIG. 4, the fallen object detection device may identify that there is a service provided by the smartphone 401. When the service provided by the smartphone 401 is a "video call," the fallen object detection device may connect the smartphone 401 with a speaker, a microphone, a camera, and an AVN screen inside the vehicle. The fallen object detection device may connect the smartphone 401 with the speaker inside the vehicle and connect the smartphone 401 with the microphone inside the vehicle so as to replace a speaker of the smartphone 401 with the speaker inside the vehicle and replace a microphone of the smartphone 401 with the microphone inside the vehicle. The fallen object detection device may connect the smartphone 401 with a camera inside the vehicle and connect the smartphone 401 with an AVN screen 402 inside the vehicle via Wi-Fi so as to replace camera of the smartphone 401 with the camera inside the vehicle and replace a display screen of the smartphone 401 with the AVN screen inside the vehicle. The camera inside the vehicle connected to the smartphone 401 may be a camera embedded into the vehicle or a camera for monitoring in the fallen object detection device.

Accordingly, the fallen object detection device may continuously provide the "video call" through the speaker, the microphone, the camera, and the AVN screen 402 inside the vehicle, so that the video call may be still connected without disconnection even though the smartphone has fallen.

When a smartphone 501 capable of making a Wi-Fi connection with the component inside the vehicle falls as illustrated in FIG. 5, the fallen object detection device may identify that there is a service provided by the smartphone 501. When the service provided by the smartphone 501 is "video playback," the fallen object detection device may connect the smartphone 501 with a speaker and an AVN screen 502 inside the vehicle. The fallen object detection device may connect the smartphone 501 with a speaker inside the vehicle and connect the smartphone 501 with the AVN screen 502 inside the via Wi-Fi so as to replace a speaker of the smartphone 501 with the speaker inside the vehicle and replace a display screen of the smartphone 501 with the AVN screen inside the vehicle.

Accordingly, the fallen object detection device may continuously provide "video playback" via the speaker and the AVN screen 502 inside the vehicle, so that video playback may be still connected without disconnection even though the smartphone 501 has fallen.

Figure 6A:
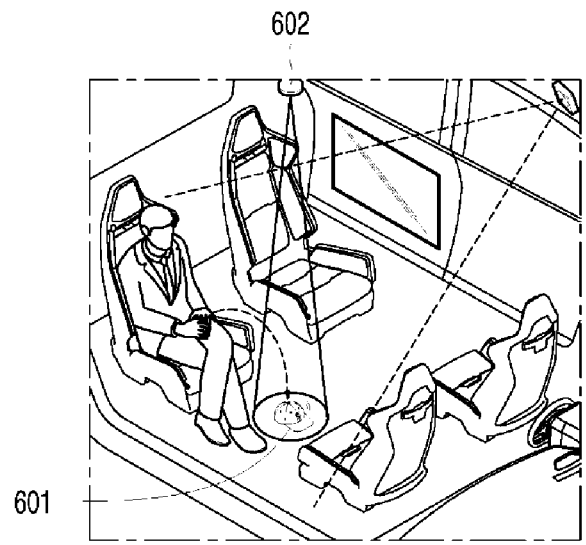
FIGS. 6A, 6B, and 6C illustrate an example in which a fallen object detection device guides a location to which an object has fallen according to an embodiment of the present disclosure.
Figure 6B:
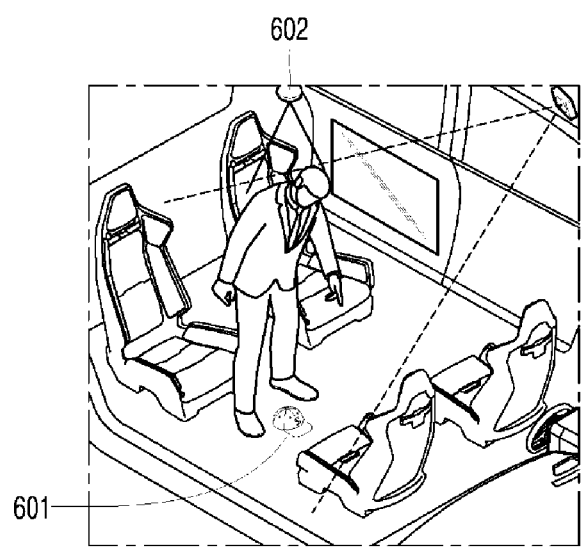
Figure 6C:
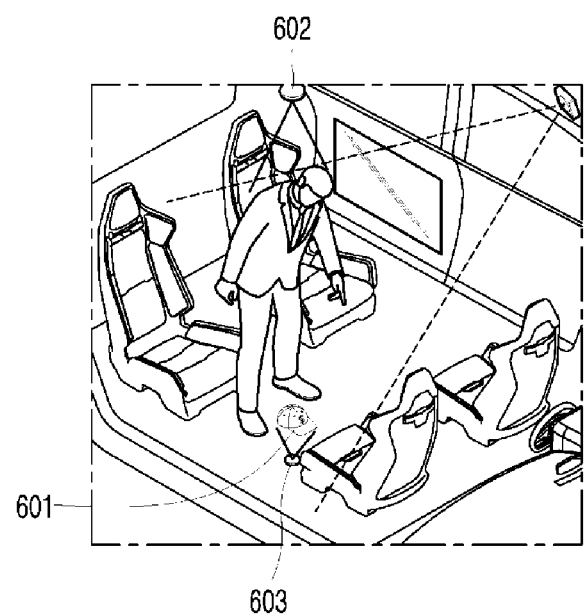

FIGS. 6A to 6C illustrate an example in which the fallen object detection device guides a location to which the object has fallen according to an embodiment of the present disclosure.

Referring to FIGS. 6A to 6C, when the object falls inside the vehicle and the inside is dark (for example, when a result value of the illumination sensor inside the vehicle is smaller than a preset value), and the passenger searches for the fallen object, the fallen object detection device may illuminate the location to which the object has fallen and assist the passenger in easily finding the object.

For example, when the passenger searches for a "hat" 601 which has fallen inside the vehicle, the fallen object detection device may turn on a first lamp 602 installed inside the vehicle to illuminate the location to which the "hat" 601 has fallen, so that the passenger can recognize the location of the fallen "hat" 601.

When the first lamp 602 cannot illuminate the "hat" 601 due to movement of the passenger, the fallen object detection device may turn off the first lamp 602 and turn on a second lamp 603 installed on a lower portion inside the vehicle to illuminate the "hat" 601 while avoiding a path obscured by the passenger.

Thereafter, based on determination that the passenger recovers the "hat" 601, the fallen object detection device may turn off the second lamp 603.

As a result, the fallen object detection device allows the lamp to illuminate the fallen object but controls the lamp to illuminate in different directions on the basis of movement of the passenger, thereby assisting the passenger in finding the fallen object inside the vehicle.

Figure 7A:
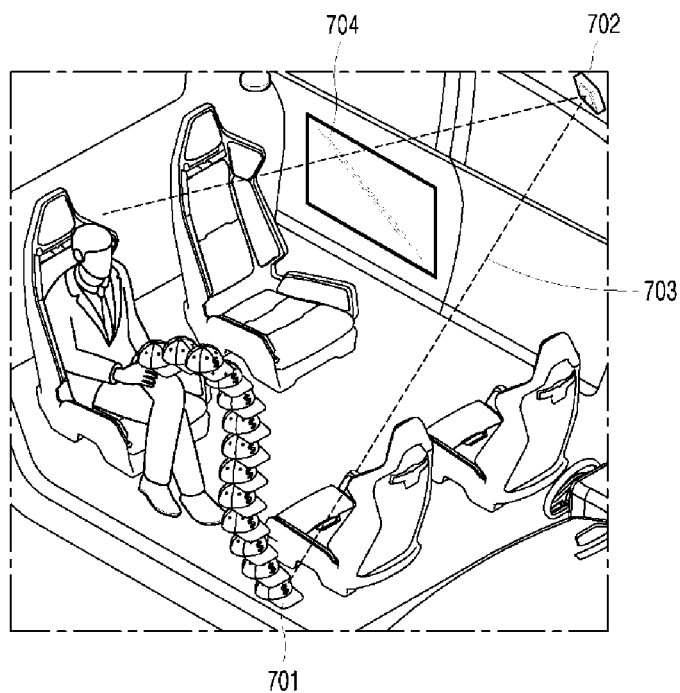
FIGS. 7A and 7B illustrate another example in which a fallen object detection device guides a location to which an object has fallen according to an embodiment of the present disclosure.
Figure 7B:
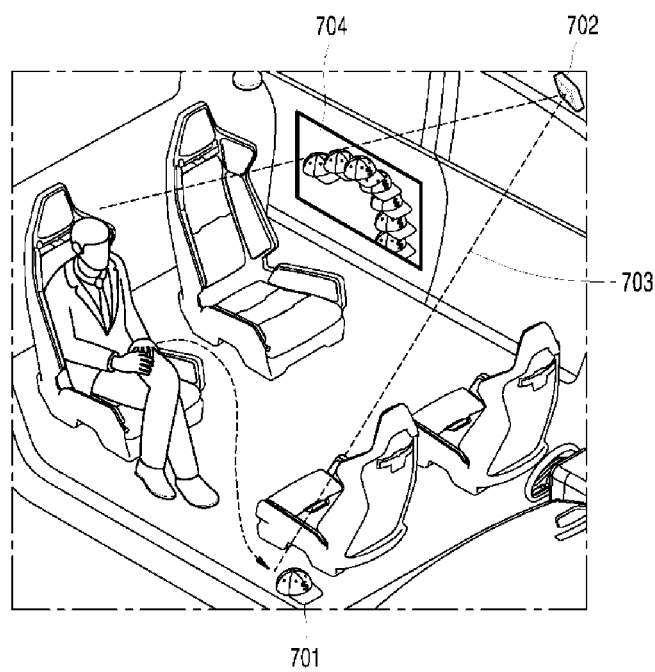

FIGS. 7A and 7B illustrate another example in which the fallen object detection device guides a location to which an object has fallen according to an embodiment of the present disclosure.

Referring to FIGS. 7A and 7B, based on determination that the object falls inside the vehicle, the fallen object detection device may store an image obtained by periodically capturing the inside of the vehicle in the database from a time point at which the object falls.

Thereafter, in response that the passenger searches for the object or when notification information of the object is provided according to termination of driving of the vehicle, when the location to which the object has fallen cannot be identified in the image because the object moves to a blind spot beyond a capturing range, the fallen object detection device may provide the image stored in the database via an AVN screen inside the vehicle.

For example, when the passenger drops a "hat" 701 or the "hat" 701 falls from a seat inside the vehicle such that the fallen object detection device determines that the "hat" 701 has fallen, the fallen object detection device may store an image, obtained by periodically capturing the inside of the vehicle, in the database from a time point at which the "hat" 701 falls.

Thereafter, when the passenger searches for the "hat" 701 or notification information of the fallen "hat" 701 is provided according to termination of driving of the vehicle, if the location to which the "hat" 701 has fallen cannot be identified in the image because the "hat" 701 has moved to a blind spot beyond a capturing range 703 of a camera 702, the fallen object detection device may provide the image stored in the database via an AVN screen 704 inside the vehicle and allow the passenger to see the "hat" 701 fall and move to the blind spot beyond the capturing range 703.

Figure 8:
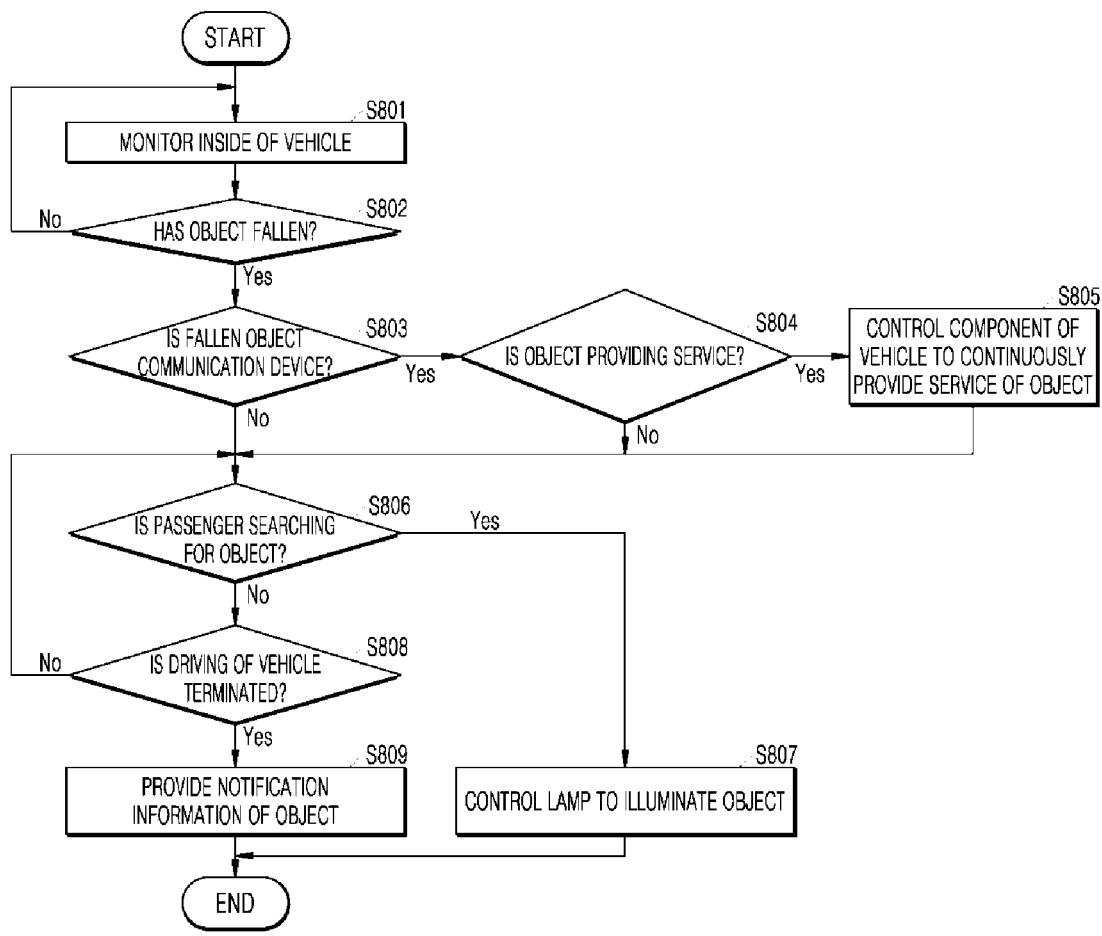
FIG. 8 is a flowchart illustrating a fallen object detection method according to an embodiment of the present disclosure.

FIG. 8 is a flowchart illustrating a fallen object detection method according to an embodiment of the present disclosure. The fallen object detection method is a method for detecting a fallen object inside a vehicle.

Referring to FIG. 8, the fallen object detection device may monitor the inside of the vehicle in which there is a passenger and an object (S801). Specifically, the fallen object detection device may generate an image by capturing the inside of the vehicle according to a preset period, and may track movement of the passenger and movement of the object based on that the passenger and the object are extracted from the image. The fallen object detection device may extract the passenger and the object from the image through a learning model trained to recognize persons and objects.

Thereafter, in response that the passenger is extracted, the fallen object detection device may detect distance and direction of movement of the passenger's arms, legs, head, and face from the image through a skeletonization algorithm and track the movement of the passenger. When the object is extracted, the fallen object detection device may detect a distance and direction of movement from the image through an object detection algorithm and track the movement of the object.

When the object falls by a preset distance or longer on the basis of the tracking result, the fallen object detection device may determine that the object has fallen. That is, when the object is removed or moves from, for example, a cradle, a seat, or a passenger's hand, and falls by a preset distance or longer, the fallen object detection device may determine that the object has fallen.

When removal of the object from the passenger's hand is identified, when a distance between the passenger's hand and the object is a preset distance or longer and the object falls by a preset distance or longer on the basis of the tracking result, the fallen object detection device determines that the object has fallen. That is, the fallen object detection device may determine that the object has fallen by further identifying that the object is removed from the passenger's hand in addition to the falling distance of the object. Accordingly, if the distance between the passenger's hand and the object is shorter than a preset distance, the identifier 104 may determine that the object has not fallen even though the object has fallen by the preset distance or longer inside the vehicle. That is, the fallen object detection device may determine that the object has not fallen by recognizing that the passenger lowers his/her hand while holding the object.

Based on determination that the object falls, the fallen object detection device may store an image, obtained by capturing the inside of the vehicle, in the database from a time point at which the object falls.

In response to determination that the object has fallen inside the vehicle on the basis of the monitoring result (S802), the fallen object detection device may identify that the object is a communication device capable of making the short-range wireless communication (for example, Bluetooth or Wi-Fi) connection with the component inside the vehicle. The communication device may include a device corresponding to one of a smartphone, wireless earphones, a tablet PC, or a notebook.

Based on identification that the object is the communication device (S803), the fallen object detection device may identify that the object provides a service. The service may be any service supported by the communication device and include, for example, at least one of a voice call, a video call, video playback, a game, or chatting.

Based on identification that the object provides a service (S804), the fallen object detection device may connect the object with a component inside the vehicle, for example, a speaker, a microphone, and an AVN screen.

The fallen object detection device may select a component required to provide the service from among the components inside the vehicle and connect the object with the selected component. For example, when the fallen object inside the vehicle is a smartphone capable of being connected to the component inside the vehicle and a service provided by the smartphone is a "voice call," the fallen object detection device may select the speaker and the microphone from among the components inside the vehicle and connect the smartphone with the selected components. When the service provided by the smartphone is a "video call," the fallen object detection device may select all of the speaker, the microphone, and the AVN screen inside the vehicle and connect the smartphone with the selected components. When the service provided by the smartphone is "video playback," the fallen object detection device may select the microphone and the AVN screen from among the components inside the vehicle and connect the smartphone with the selected components.

When the object is connected with the component, the fallen object detection device may make a request for identification information to the fallen object and receive the identification information from the object. In response that the received identification information is found in a connected device list pre-stored in the database, the fallen object detection device may connect the object with the component via short-range wireless communication and thus only connect communication devices pre-registered in the connected device list with the component inside the vehicle.

Based on identification that a plurality of objects which has fallen at a time interval shorter than a preset time difference (for example, 3 seconds) are communication devices capable of being connected with the component inside the vehicle, the fallen object detection device may select an object having a high priority on the basis of a preset criterion (for example, an order determined by the type of communication devices or an order in the connected device list) from among the plurality of objects and connect the selected object with the component inside the vehicle.

When a plurality of objects, for example, a smartphone and a tablet PC, which are capable of being connected to the component inside the vehicle, fall at an interval of 2 seconds, the fallen object detection device may select the smartphone having a higher priority from among the plurality of objects and connect the selected smartphone with the component inside the vehicle. When a plurality of objects, for example, a first smartphone (a driver's phone) and a second smartphone (a fellow passenger's phone) capable of being connected to the component inside the vehicle fall at an interval of 2 seconds, the fallen object detection device may select the first smartphone located at a relatively higher position in the connected device list from among the plurality of objects and connect the selected smartphone with the component inside the vehicle.

When the object is connected to the component, the fallen object detection device may control the component inside the vehicle to continuously provide the service which is provided by the object (S805).

Thereafter, the fallen object detection device may identify that the passenger searches for the object. The fallen object detection device may track movement of the passenger in an image obtained by capturing the inside of the vehicle and determine that the passenger lowers his/her head on the basis of the tracking result of the movement of the passenger. Based on determination that the passenger lowers his/her head, the fallen object detection device may identify that the passenger is searching for the object.

Based on identification that the passenger is searching for the object (S806) and based on determination that the inside of the vehicle is dark by an illumination sensor inside the vehicle (that is, when a result value of the illumination sensor inside the vehicle is smaller than a preset value), the fallen object detection device may control a lamp inside the vehicle to illuminate the fallen object and guide the passenger to the location at which the object has fallen (S807). A method for guiding the location to which the object has fallen with the lamp inside the vehicle will be described below with reference to FIG. 9.

Based on identification that the passenger is not searching for the object (S806), the fallen object detection device may determine that driving of the vehicle is terminated.

Based on identification that driving of the vehicle is terminated (S808), the fallen object detection device may provide notification information of the object via the component inside the vehicle or the lamp inside the vehicle (S809).

In response that the object moves to a blind spot beyond a capturing range and cannot be tracked such that the location to which the object has fallen cannot be identified in a periodically captured image, the fallen object detection device may provide an image stored in the database via the component inside the vehicle and allow the passenger to see the object fall and move to the blind spot (S807 or S809).

Based on identification that driving of the vehicle is not terminated (S808), the fallen object detection device may proceed (S806).

Figure 9:
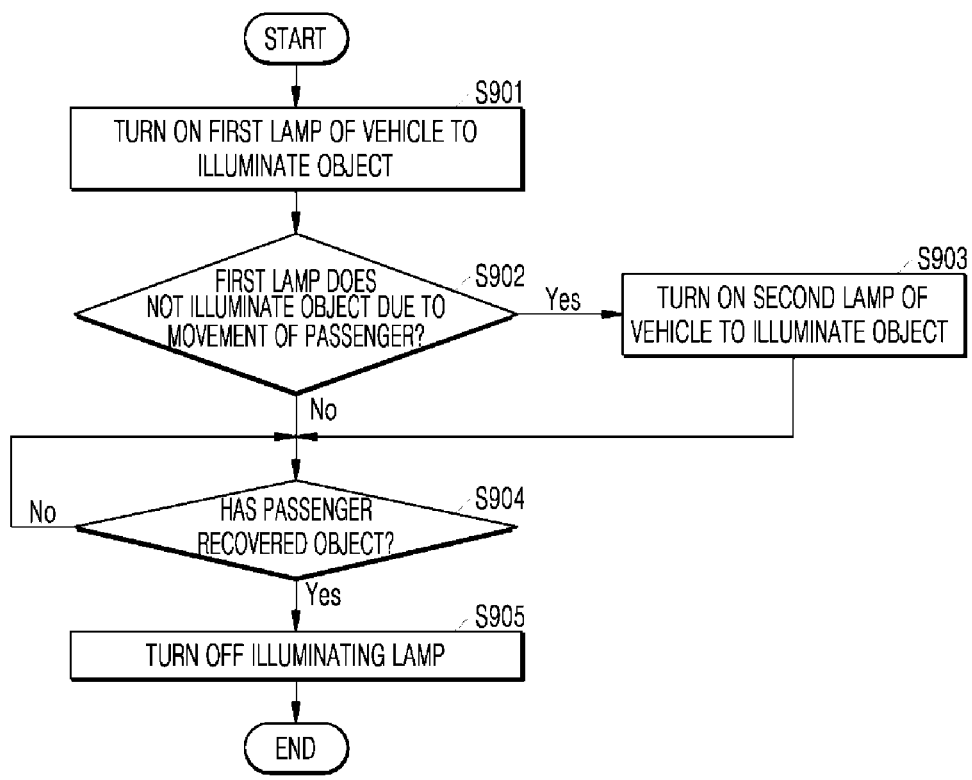
FIG. 9 is a flowchart illustrating a method by which a fallen object detection device guides a location to which an object has fallen according to an embodiment of the present disclosure.

FIG. 9 is a flowchart illustrating a method by which the fallen object detection device guides a location to which an object has fallen according to an embodiment of the present disclosure.

Referring to FIG. 9, the fallen object detection device may turn on a first lamp inside the vehicle (for example, a lamp installed an upper portion inside the vehicle) to illuminate the location to which the object has fallen (S901). That is, based on identification that the passenger is searching for the fallen object inside the vehicle, the fallen object detection device may illuminate the location to which the object has fallen and guide the passenger to the location to which the object has fallen, so that the passenger can be assisted in finding the object.

When the passenger moves to recover the object, the fallen object detection device may identify that the first lamp continuously illuminates the object.

When the first lamp does not illuminate the object due to movement of the passenger (S902), the fallen object detection device may turn off the first lamp and turn on a second lamp (for example, a light installed on a lower portion inside the vehicle) to illuminate the object while avoiding a path obscured by the passenger (S903). That is, when the light of the first lamp, which has illuminated the object, is obscured by movement of the passenger, the fallen object detection device may illuminate a different direction with the second lamp from that of the light of the first lamp.

The fallen object detection device may further identify that the lamp inside the vehicle directly shines a light into a passenger's eyes, and when the lamp directly shines a light into the passenger's eyes on the basis of the identification result, turn off the corresponding lamp and turn on another lamp.

Thereafter, the fallen object detection device may determine that the passenger recovers the object. When the distance between the passenger's hand and the fallen object is shorter than a preset distance in the image obtained by periodically capturing the inside of the vehicle, and the fallen object rises by a preset distance or higher, the fallen object detection device may determine that the passenger has recovered the object.

Based on determination that the passenger has recovered the object (S904), the fallen object detection device may turn off the illuminating lamp (S905).

As a result, the fallen object detection device may control each of the plurality of lamps to sequentially illuminate an optimal direction, thereby assisting the passenger in finding the fallen object inside the vehicle.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms "a/an" and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof. It should be apparent to those skilled in the art that various substitutions, changes and modifications which are not exemplified herein but are still within the spirit and scope of the present disclosure may be made.

The present disclosure is thus not limited to the example embodiments described above, and rather intended to include the following appended claims, and all modifications, equivalents, and alternatives falling within the spirit and scope of the following claims.

What is claimed is:

1. An apparatus for detecting a fallen object inside a vehicle; the apparatus comprising:
    a monitor configured to monitor an inside of the vehicle in which a passenger and an object are present;
    an identifier configured to, in response to determination that the object has fallen inside the vehicle based on a monitoring result, identify that the object is a communication device capable of being connected to a component inside the vehicle; and
    a processor configured to, based on identification that the object is the communication device, connect the object with the component and control the component to continuously provide a service which is provided by the object.

2. The apparatus of claim 1, wherein the monitor comprises:
    a capturer configured to generate an image by capturing the inside of the vehicle according to a preset period; and
    a tracker configured to track movement of the passenger and movement of the object based on the passenger and the object extracted from the image, and
        wherein the identifier is configured to determine, based on a tracking result, that the object has fallen in response that a distance between a hand of the passenger and the object is a preset distance or longer, and the object falls downward by a preset distance or longer.

3. The apparatus of claim 1, wherein the monitor is configured to generate an image by capturing the inside of the vehicle according to a preset period, and
    wherein the processor is configured to store the image in a database from a time point at which the object falls, and in response that the object moves to a blind spot beyond a capturing range such that a location to which the object has fallen cannot be identified in the image, provide the stored image via the component to allow the passenger to see the object fall and move to the blind spot.

4. The apparatus of claim 1, wherein, in response that the object provides at least one service from among a voice call, a video call, or video playback, the processor is configured to select a component required to provide the service from among components including at least one of a speaker, a microphone, or an audio video navigation (AVN) screen inside the vehicle and connect the selected component with the object.

5. The apparatus of claim 1, wherein the identifier is configured to identify that the object is the communication device in response that the object is a device corresponding to one of a smartphone, wireless earphones, a tablet personal computer (PC), or a notebook capable of performing short-range wireless communication.

6. The apparatus of claim 1, further comprising a communicator configured to communicate with the object and receive identification information of the object,
    wherein the processor is configured to receive the identification information from the object via the communicator, and in response that the received identification information is found in a pre-stored connected device list, connect the object with the component.

7. The apparatus of claim 1, wherein the identifier is configured to further identify that the passenger searches for the object, and
wherein the processor is configured to turn on a first lamp inside the vehicle to illuminate a location to which the object has fallen in response that the passenger searches for the object and a result value of an illumination sensor inside the vehicle is smaller than a preset value.

8. The apparatus of claim 7, wherein, in case that the first lamp cannot illuminate the object due to the movement of the passenger, the processor is configured to turn off the first lamp and turn on a second lamp capable of illuminating the object while avoiding a path obscured by the passenger.

9. The apparatus of claim 1, wherein the monitor comprises:
the capturer configured to generate the image by capturing the inside of the vehicle according to the preset period; and
the tracker configured to track the movement of the passenger in response that the passenger is extracted from the image, and
wherein the identifier is configured to determine that the passenger lowers his/her head, based on the tracking result, and based on determination that the passenger lowers his/her head, identify that the passenger is searching for the object.

10. The apparatus of claim 7, wherein, based on identification that the passenger is not searching for the object, the processor is configured to provide notification information of the object via the component or the lamp inside the vehicle in response that driving of the vehicle is terminated.

11. The apparatus of claim 1, wherein, based on identification that a plurality of objects which have fallen at an interval shorter than a preset time difference are communication devices capable of being connected to the component inside the vehicle, the processor is configured to select an object having a high priority from among the plurality of objects, based on a preset criterion, and connect the selected object with the component.

12. A method for detecting a falling object inside a vehicle, the method comprising:
monitoring an inside of the vehicle in which a passenger and an object are present;
in response to determination that the object has fallen inside the vehicle based on a monitoring result, identifying that the object is a communication device capable of making a short-range wireless communication connection with a component inside the vehicle; and
based on identification that the object is the communication device, connecting the object with the component and controlling the component to continuously provide a service which is provided by the object.

13. The method of claim 12, wherein the monitoring of the inside of the vehicle comprises:
generating an image by capturing the inside of the vehicle according to a preset period; and
tracking movement of the passenger and movement of the object based on that the passenger and the object are extracted from the image, and
wherein the identifying of that the object is the communication device capable of being connected to the component inside the vehicle comprises determining, based on a tracking result, that the object has fallen based on that a distance between a hand of the passenger and the object is a preset distance or longer, and the object falls downward by a preset distance or longer.

14. The method of claim 12, wherein the monitoring of the inside of the vehicle comprises generating an image by capturing the inside of the vehicle according to a preset period, the method further comprising:
storing the image in a database from a time point at which the object falls; and
in response that the object moves to a blind spot beyond a capturing range such that a location to which the object has fallen cannot be identified in the image, providing the stored image via the component to allow the passenger to see the object fall and move to the blind spot.

15. The method of claim 12, wherein the controlling of the component comprises, in response that the object provides at least one service from among a voice call, a video call, or video playback, selecting a component required to provide the service from among components including at least one of a speaker, a microphone, or an audio video navigation (AVN) screen inside the vehicle and connecting the selected component with the object.

16. The method of claim 12, wherein the controlling of the component comprises receiving identification information from the object via a communicator, and in response that the received identification information is found in a pre-stored connected device list, connecting the object with the component.

17. The method of claim 12, further comprising:
identifying that the passenger searches for the object; and
turning on a first lamp inside the vehicle to illuminate a location to which the object has fallen based on identification that the passenger searches for the object and a result value of an illumination sensor inside the vehicle is smaller than a preset value.

18. The method of claim 17, further comprising, in case that the first lamp cannot illuminate the object due to the movement of the passenger, turning off the first lamp and turning on a second lamp capable of illuminating the object while avoiding a path obscured by the passenger.

19. The method of claim 17, further comprising, based on identification that the passenger is not searching for the object, providing notification information of the object via the component or the lamp inside the vehicle in response that driving of the vehicle is terminated.

20. The method of claim 12, wherein the controlling of the component comprises, based on identification that a plurality of objects which have fallen at an interval shorter than a preset time difference are communication devices capable of making the short-range wireless communication connection with the component inside the vehicle, selecting an object having a high priority from among the plurality of objects, based on a preset criterion, and connecting the selected object with the component.

* * * * *